United States Patent
Yoon et al.

(10) Patent No.: US 10,396,446 B2
(45) Date of Patent: Aug. 27, 2019

(54) DUAL FUNCTION HELIX ANTENNA

(71) Applicant: University of Florida Research Foundation, Inc., Gainesville, FL (US)

(72) Inventors: Yong-Kyu Yoon, Gainesville, FL (US); Xiaoyu Cheng, Gainesville, FL (US); Gloria Jung-A Kim, Gainesville, FL (US); Jiyu Wu, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 375 days.

(21) Appl. No.: 14/892,448

(22) PCT Filed: May 28, 2014

(86) PCT No.: PCT/US2014/039731
§ 371 (c)(1),
(2) Date: Nov. 19, 2015

(87) PCT Pub. No.: WO2014/193922
PCT Pub. Date: Dec. 4, 2014

(65) Prior Publication Data
US 2016/0111775 A1    Apr. 21, 2016

Related U.S. Application Data

(60) Provisional application No. 61/827,955, filed on May 28, 2013.

(51) Int. Cl.
*H01Q 1/36* (2006.01)
*H01Q 1/27* (2006.01)
(Continued)

(52) U.S. Cl.
CPC ............. *H01Q 1/362* (2013.01); *H01Q 1/273* (2013.01); *H01Q 1/38* (2013.01); *H01Q 1/46* (2013.01);
(Continued)

(58) Field of Classification Search
CPC ...... H01Q 11/08; H01Q 11/083; H01Q 1/362; H01Q 1/36; H01Q 9/27; H01Q 1/40; H01Q 1/273; H01Q 1/46; H01Q 1/38
See application file for complete search history.

(56) References Cited

U.S. PATENT DOCUMENTS

| | | | |
|---|---|---|---|
| 4,675,690 A | * | 6/1987 | Hoffman ............ H01Q 11/083 343/895 |
| 6,112,102 A | | 8/2000 | Zhinong |

(Continued)

FOREIGN PATENT DOCUMENTS

WO    2010104569 A1    3/2010

OTHER PUBLICATIONS

International Search Report for PCT/US2014/039731 published on Dec. 4, 2014.
(Continued)

*Primary Examiner* — Jessica Han
*Assistant Examiner* — Awat M Salih
(74) *Attorney, Agent, or Firm* — Thomas Horstemeyer, LLP

(57) ABSTRACT

Various examples are provided for a helix antenna with dual functionality, in one embodiment, among others, a helix antenna includes a flexible substrate and a copper trace disposed on a side of the flexible substrate at a tilting angle (Θ). Turns of the helix antenna are formed from the copper trace by wrapping the flexible substrate. In another embodiment, a system includes a helix antenna, a radio frequency (RF) communication circuit coupled to a first end of the
(Continued)

helix antenna, and a low frequency (LF) power transmission circuit coupled to the first end of the helix antenna. The RF communication circuit can process RF signals received by the helix antenna and the LF power transmission circuit can regulate LF voltage induced in the helix antenna.

19 Claims, 4 Drawing Sheets

(51) Int. Cl.
    *H01Q 1/38*     (2006.01)
    *H01Q 1/46*     (2006.01)
    *H01Q 11/08*     (2006.01)
    *H04B 1/40*     (2015.01)

(52) U.S. Cl.
    CPC ........... *H01Q 11/08* (2013.01); *H01Q 11/083* (2013.01); *H04B 1/40* (2013.01)

(56) References Cited

U.S. PATENT DOCUMENTS

| | | |
|---|---|---|
| 6,340,954 B1 | 1/2002 | Annamaa et al. |
| 7,639,204 B2 | 12/2009 | Chau |
| 7,711,434 B2 | 5/2010 | Denker et al. |
| 7,994,996 B2 | 8/2011 | Rebeiz et al. |
| 8,097,983 B2 | 1/2012 | Karalis et al. |
| 8,180,080 B2 | 5/2012 | Polinske |
| 9,037,200 B2 * | 5/2015 | Yoon ......................... H01Q 1/50 343/702 |
| 2006/0043199 A1 * | 3/2006 | Baba ................ G06K 19/07749 235/492 |
| 2008/0024091 A1 * | 1/2008 | Yamazaki ................ H01Q 1/36 320/166 |
| 2009/0043164 A1 * | 2/2009 | Hasegawa .......... A61B 1/00016 600/118 |
| 2009/0115685 A1 | 5/2009 | Chung et al. |
| 2010/0019985 A1 * | 1/2010 | Bashyam ............. A61B 5/0031 343/873 |
| 2010/0190436 A1 | 7/2010 | Cook et al. |
| 2010/0207803 A1 * | 8/2010 | McMakin ............... G01S 7/026 342/22 |
| 2010/0222010 A1 | 9/2010 | Ozaki et al. |
| 2010/0256480 A1 | 10/2010 | Bottomley et al. |
| 2011/0279002 A1 | 11/2011 | Han et al. |
| 2012/0130206 A1 * | 5/2012 | Vajha ................. A61N 1/37229 600/302 |
| 2012/0223593 A1 | 9/2012 | Kamata |
| 2012/0235502 A1 | 9/2012 | Kesler et al. |
| 2014/0176447 A1 * | 6/2014 | Alameh .................. G06F 3/044 345/173 |
| 2016/0135684 A1 * | 5/2016 | Kappel ................ A61B 5/0015 600/301 |

OTHER PUBLICATIONS

Bossetti, "Design and Evaluation of a Transcutaneous Energy Transfer System", Duke University, Mar. 17, 2009, http://dukespace.lib.duke.edu/dspace/bitstream/handle/10161/1083/D_Bossetti_Chad_a_200904.pdf?sequence=1.
Cheng, et al., "A Dual-Function Helix Antenna With Wireless Communication and Power Transmission Capabilities for Capsule Endoscope", Electrical and Computer Engineering, University of Florida, Gainesville, FL, USA, Dec. 2012.
Kumagai, et al., "A 430MHz band receiving antenna for microwave power transmission to capsular endoscope", General Assembly and Scientific Symposium, 2011 978-1-4244-6051-9/11/$26.00, IEEE.
Chan, et al., "A prototype design of a wireless capsule endoscope", Biochemistry and Biophysics, vol. 3, No. 4, 2006, pp. 253-262.
Khripkov, et al., "Integrated Resonant Structure for Simultaneous Wireless Power Transfer and Data Telemetry," Antennas and Wireless Propagation Letters, IEEE, vol. 11, 2012, pp. 1659-1662.
Marnat, et al. "On-Chip Implantable Antennas for Wireless Power and Data Transfer in a Glaucoma-Monitoring SoC," Antennas and Wireless Propagation Letters, IEEE, vol. 11, 2012, pp. 1671-1674.
Ali, et al., "A new circularly polarized rectenna for wireless power transmission and data communication," Antennas and Wireless Propagation Letters, IEEE, vol. 4, 2005, pp. 205-208.
Heikkinen, et al., "Low-profile circularly polarized rectifying antenna for wireless power transmission at 5.8 GHz," Microwave and Wireless Components Letters, IEEE, vol. 14, No. 4, Apr. 2004, pp. 162-164.
Strassner, et al., "5.8-GHz circularly polarized rectifying antenna for wireless microwave power transmission," Microwave Theory and Techniques, IEEE Transactions on, vol. 50, No. 8, Aug. 2002, pp. 1870-1876.
Ali, et al., "Wideband (5-6 GHz WLAN band) circularly polarized patch antenna for wireless power sensors," Antennas and Propagation Society International Symposium, IEEE, vol. 2, Jun. 2003, pp. 34-37.

* cited by examiner

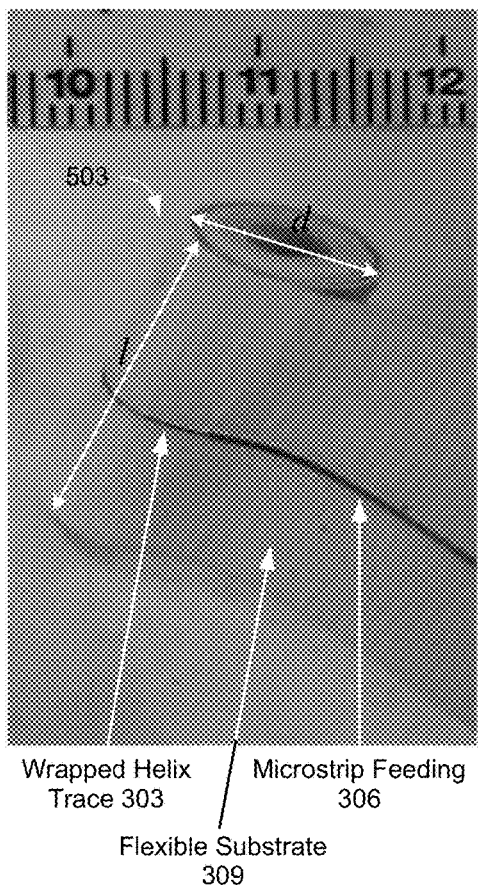
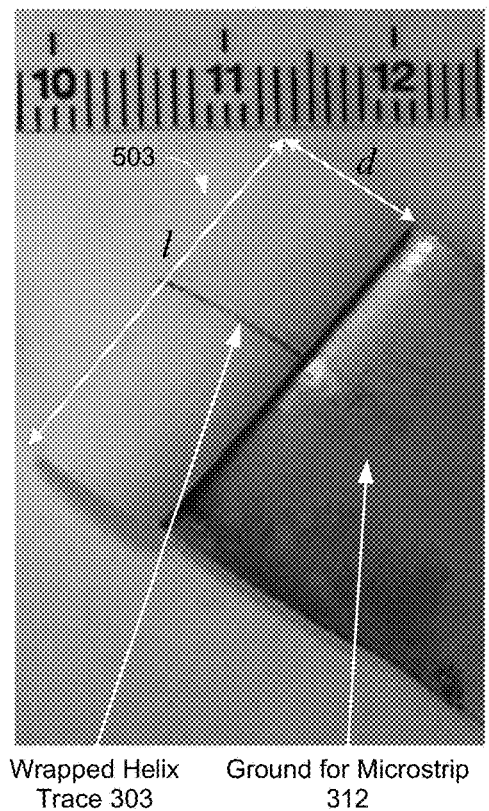
FIG. 5A
FIG. 5B

DUAL FUNCTION HELIX ANTENNA

CROSS REFERENCE TO RELATED APPLICATIONS

This application is the 35 U.S.C. § 371 national stage application of PCT Application No. PCT/US2014/039731, filed May 28, 2014, which claims priority to U.S. provisional application entitled "DUAL FUNCTION HELIX ANTENNA", having Ser. No. 61/827,955, filed May 28, 2013, both of which are herein incorporated by reference in their entirety.

BACKGROUND

Endoscopes are utilized for the examination and treatment of the gastrointestinal (GI) tract. Endoscopes include imaging capabilities to aid in diagnosis of the GI tract related disorders and can include features that allow for treatment or intervention. Generally, conventional wired endoscopes include an insertion tube with a flexible shaft, which is inserted to obtain access to the GI tract. Wireless capsule endoscopes do not have a tube but rely on wireless data communication between the capsule in the GI track and a receiver outside the body.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 5A and 5B are front and rear views of a fabricated helix antenna of FIGS. 1 and 3 in accordance with various embodiments of the present disclosure.

DETAILED DESCRIPTION

Figure 1:
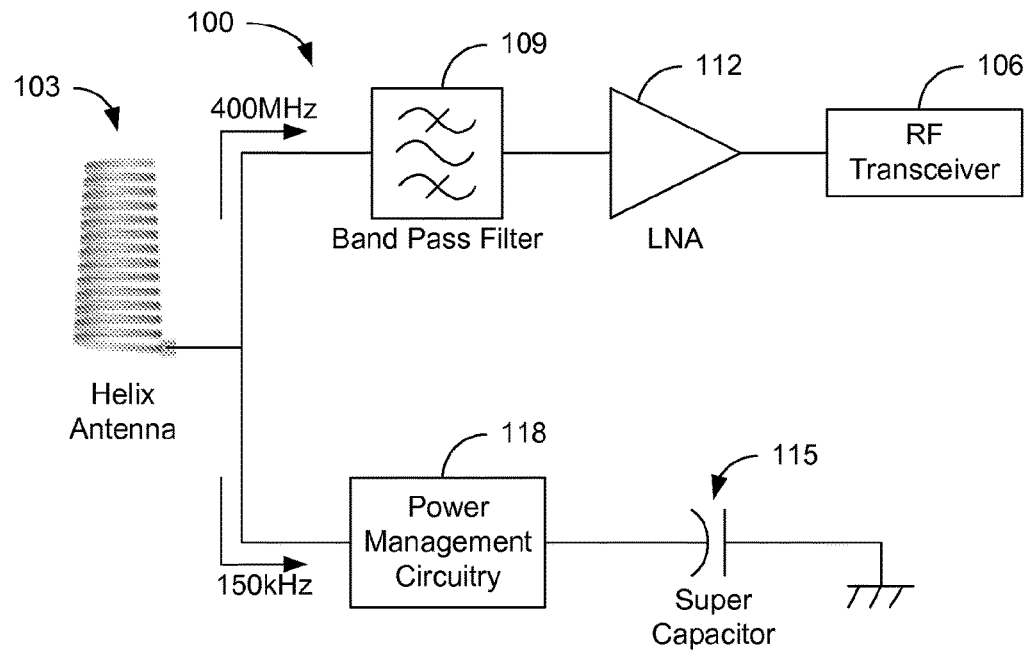
FIG. 1 is a graphical representation of a circuit illustrating dual functional operation of a helix antenna in accordance with various embodiments of the present disclosure.

Disclosed herein are various embodiments related to a helix antenna with dual functionality. Reference will now be made in detail to the description of the embodiments as illustrated in the drawings, wherein like reference numbers indicate like parts throughout the several views.

An endoscopic approach is utilized in gastrointestinal (GI) tract related diseases diagnosis and management. Traditional wired endoscopes can be limited in their depth of insertion and may produce trauma related with this kind of diagnosis. Wireless endoscopes may be used for non-invasive diagnosis procedures. Wireless capsule endoscopes rely on wireless data communication and energy transfer between the capsule in the GI track and electronics (e.g., a receiver or transceiver) outside the body. For both wireless data communication and energy transfer, the antenna is an important component for system operation. With an appropriate design, a single antenna can be operated in dual functions, e.g., one for wireless data communication in the MHz and/or GHz range and one for wireless energy transfer in the kHz range.

Wireless endoscopes have the ability to provide comprehensive images of the gastrointestinal (GI) tract of patients such as, e.g., humans or animals (horse, cow, etc.). Considerations for wireless endoscope operation include factors such as wireless communication capabilities and available power for operation of the endoscope. To provide good communications, an antenna design with good antenna efficiency and an omni-directional radiation pattern, while satisfying all related regulations in the human body environment, is desirable. The antenna design for use in the human body environment should consider an accurate but economic human body model which could reflect key parameters such as the relative permittivity and conductivity of the body organs. Since the electrical length of a passive RF device is sensitive to both parameters, antennas designed in free space are usually not optimized to be used in the human body environment. For the power supply, in many cases only the limited number of batteries can be accommodated due to the small volume of the capsule. The ability to recharge the power supply can reduce the size and/or number of batteries in a wireless endoscope.

In this disclosure, a dual-functional helix antenna is presented. The antenna can be designed on a flat flexible liquid crystalline polymer (LCP) substrate and rolled up into a cylindrical shape, resulting in a three-dimensional helix structure. Other flexible substrate materials can include, but are not limited to, polyimide, epoxy, and/or paper. The helix antenna can operate as a far field antenna at, e.g., 400 MHz for wireless communications. The helix antenna may also serve as an inductive element for near-field wireless power transmission at, e.g., 150 kHz to allow for charging of the power supply. With a helix outmost diameter of about 6 mm and a height of about 7.6 mm, the antenna demonstrated an omni-directional radiation pattern at 400 MHz. With a CMOS based voltage regulator circuit integrated with the antenna, a stable DC output voltage of about 2.6 V with respect to a wide range of input AC voltage values was demonstrated. Both the far field radiation functionality and the near field power transmission functionality are detailed. The helix antenna design can aid in harvesting energy for wireless sensor nodes, contribute to a compact sensor system, and assist in blind spot minimization by the omni-directionality.

With the advanced CMOS technology, it is relatively easy to implement electronic components in an endoscope such as a microcontroller, a wireless transceiver, sensor interfacing circuits, etc. However, battery capacity is not quite scalable for a wireless endoscope system. An inductive link for wireless endoscope online charging may be used to reduce the battery size and extend the operation of the endoscope. A helix antenna may be utilized for both a wireless communication function and a wireless charging capability in a single device. This antenna can be designed on a flexible liquid crystalline polymer (LCP) substrate and rolled up into a cylindrical shape to implement the helix antenna. All necessary electronics can be placed on the same LCP plane with the antenna and, therefore, no lossy and complicated inter-layer communication vias would be needed.

Dual Functional Operation

Referring to FIG. 1, shown is a graphical representation of a circuit 100 illustrating the dual functional operation of the helix antenna 103. The helix antenna 103 is linked to two pathways: the first pathway is to a high frequency transceiver 106 through a band pass filter (BPF) 109 and a low noise amplifier (LNA) 112, and the second pathway is to the energy storage device 115 (e.g., a super capacitor or battery) through a power management circuit 118. The first pathway is impedance matched for RF communications and the second pathway is impedance matched for lower frequency near field power transmission.

In the example of FIG. 1, the helix antenna 103 is designed to have an input impedance matched for RF communications at 400 MHz. An incoming RF signal preferably goes to the first (RF) pathway because of the impedance matching, while the incoming RF signal won't go through the second (low frequency) pathway because of the impedance mismatch. If a low frequency signal (e.g., at 150 kHz) is received by the helix antenna 103, it is blocked from the first (RF) pathway by the band pass filter 109. The low frequency signal can go to the second (low frequency) pathway through the power management circuit 118. This circuit arrangement allows the single helix antenna 103 to support both RF communications and near field power transmissions.

Helix Antenna Design

The antenna design procedure is now examined. Because the helix antenna will be operating in a human body, the electromagnetic characteristics of the human body are examined and then the antenna design and fabrication procedure are discussed.

Human Body Model

The human body forms a complicated propagation channel for electromagnetic waves. It is dispersive and the constitutive parameters include relative permittivity and conductivity which can vary significantly as a function of frequency. The human body is lossy. Thus, a large portion of RF energy radiated from the helix antenna 103 will be dissipated by the human body, which can result in very low antenna power efficiency. In addition, the absorbed RF energy may cause negative effects on the body such as hyperthermia. Therefore, medical devices dealing with electromagnetic signals are subject to institutional regulations. In the United States, the specific absorption rate (SAR) is used to evaluate the amount of RF energy absorbed by the human body. SAR is defined as:

$$SAR(W/kg) = \int \frac{\sigma(r)|E|^2}{\rho(r)} dr \quad (1)$$

where σ is the conductivity in S/m, ρ is the mass density in Kg/m³, and E is the electric field strength in V/m. SAR indicates electromagnetic energy absorbed by unit weight, where either a 1 g or 10 g sample is used for such a measurement. The Federal Communication Commission (FCC) regulates that the maximum SAR measured in the human body should not exceed 1.6 W/kg.

Due to the complex nature of the human body, a commercially available human body model from the high frequency structure simulator (HFSS, Ansys Inc.) was adopted. This model offers the human body outline as well as frequency dependent permittivity and conductivity information for major human tissues and organs.

Figure 2:
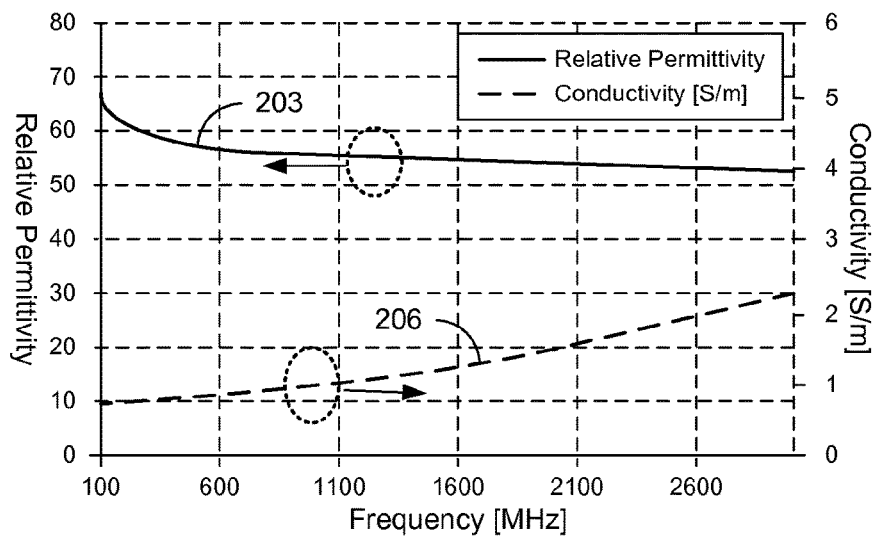
FIG. 2 is a plot illustrating an example of a simulated human body frequency response in accordance with various embodiments of the present disclosure.

Referring to FIG. 2, the human body parameters are extracted as shown. The relative permittivity 203 rolls off exponentially at higher frequencies while the conductivity 206 increases as a function of frequency. Therefore, according to EQN. (1) above, a higher frequency band is expected to show a higher SAR value for the same E-field strength.

Antenna Design

With the human body model parameters available, the helix antenna 103 (FIG. 1) can be designed for the operation of the inside human body. The helix antenna 103 may be designed based on a commercially available LCP substrate or other appropriate substrate. For example, Ultralam 3850 (Rogers, Inc.) is an LCP substrate which is available with a thickness of 4 mil (0.1 mm), a dielectric constant of 2.9, and a loss tangent of 0.0012.

Figure 3:
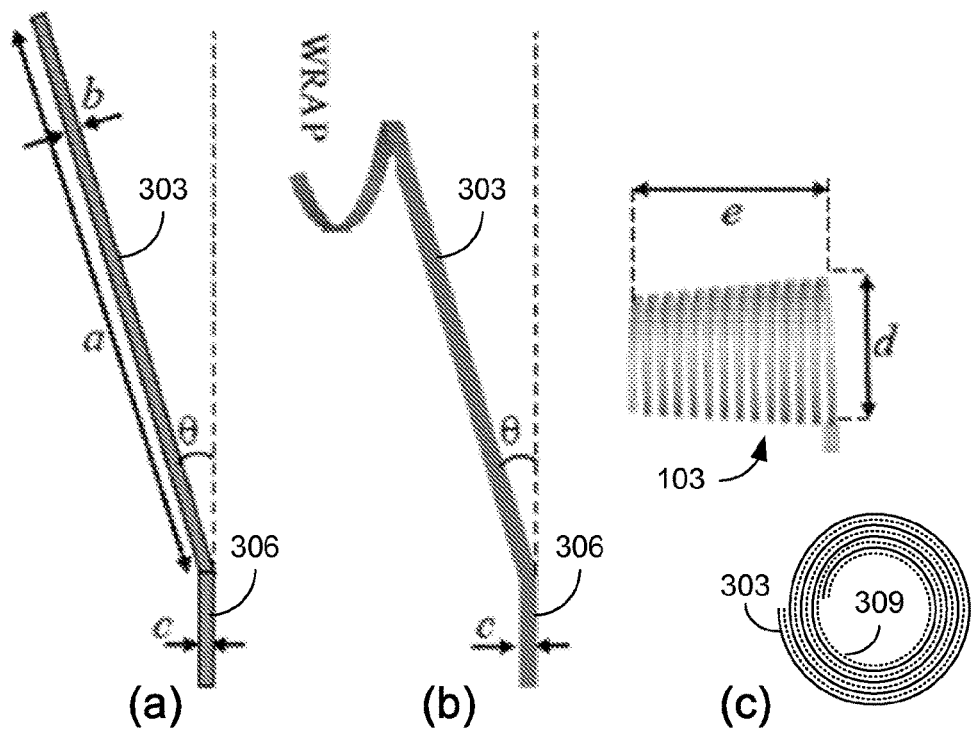
FIG. 3 is a graphical representation of the design of the helix antenna of FIG. 1 in accordance with various embodiments of the present disclosure.

Referring to FIG. 3, shown is a graphical representation of the design of the helix antenna 103. The antenna design begins as shown in FIG. 3(a) with a piece of tilted copper trace 303 and a microstrip feed 306 (or a coplanar waveguide feed) on a flexible substrate (not shown) laid flat. In the example of FIG. 3, the copper trace 303 length is a=220 mm and width is b=0.3 mm and the microstrip feed 306 width is c=0.65 mm. Other dimensions may be used to provide the desired antenna characteristics. The tilting angle (θ) is exaggerated for clarity. In the example of FIG. 3, a tilting angle of θ=1.9° is used. Other tilting angles (θ) may be used to provide the desired axial spacing between turns of the helix antenna 103. The helix antenna 103 is formed by wrapping the flexible substrate (not shown) into a cylindrical shape as illustrated in FIG. 3(b).

FIGS. 5A and 5B show views of wrapping the flexible substrate 309 to fabricate a helix antenna 103. As the substrate 309 is rolled, a tapered helix coil with varying diameter is formed by the copper trace 303. The radial spacing between turns of the helix antenna 103 is given by the thickness of the substrate 309. Referring back to FIG. 3(c), a schematic diagram is shown of the final antenna 103 where a helix with a varying diameter for each turn is implemented. An end view illustrates how the flexible substrate 309 (dashed line) is interposed between each turn of the copper trace 303 (solid line). Using a substrate with a thickness of 0.1 mm, the fully wrapped helix antenna 103 of FIG. 3(c) may have a diameter of d=6 mm and an axial length of e=7.6 mm. By varying the thickness of the substrate 309, the taper of the helix antenna 103 may be varied. Compared to the normal turn-by-turn winding approach, the wrapping method provides an easy and convenient implementation of a helix antenna 103.

Figure 4:
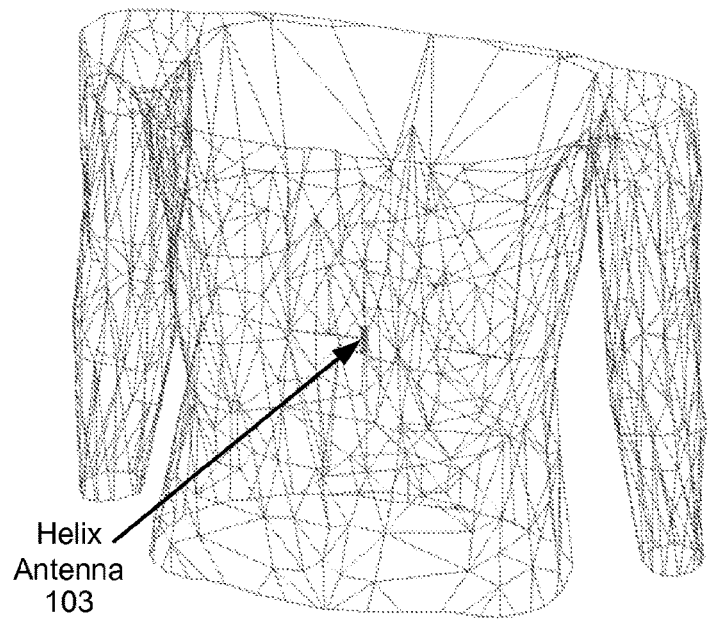
FIG. 4 is a graphical representation illustrating a three-dimensional (3-D) human body model for use in antenna simulation in accordance with various embodiments of the present disclosure.

Antenna design and optimization can be performed using the high frequency structure simulator (HFSS, Ansys, Inc.), a 3-D full wave microwave simulator using a finite element method (FEM). For analysis, the helix antenna 103 is located in the HFSS human body model as shown in FIG. 4. Dimensions of the copper trace 303 (e.g., a, b, θ) and the flexible substrate 309 (e.g., thickness) may be varied to obtain the desired performance.

For testing, a helix antenna 103 was carefully optimized and fabricated on a flexible substrate using a milling machine (S100, LPKF Inc.). Referring to FIGS. 5A and 5B, shown are front and rear views, respectively, of the fabricated helix antenna 503. The last turn of the wrapped copper trace 303 is visible on the flexible substrate 309. Because of the size of the flexible substrate 309, the length of the fabricated antenna was l=22 mm and the diameter was d=6 mm. In addition, the microstrip feed 306 for the fabricated helix antenna 503 can be seen in FIG. 5A. A ground 312 for the microstrip 306 can be provided on the opposite side of the flexible substrate 309 as shown in FIG. 5B. In some implementations, electronic components such as a microcontroller, a wireless transceiver, sensor interfacing circuits, power management circuits, etc. may be provided on portions of the flexible substrate 309.

The fabricated helix antenna 503 exhibited dual function operation at two different frequencies: a radiation antenna at 400 MHz for wireless communication and an inductive coil at 150 kHz for wireless power transmission. Characterization of the far and near field performance of the fabricated helix antenna 503 is provided below.

Antenna Far Field Performance

For the antenna performance tests, a phantom for the human body was prepared. The chemical composition of the phantom is summarized below in TABLE 1. The human body phantom solution was maintained at room temperature. The relative permittivity at 400 MHz was 58.0 and the conductivity was 0.83 S/m. These values are very close to those of the human body model obtained in FIG. 2, where the HFSS human body model shows a relative permittivity of 58.3 and a conductivity of 0.81 S/m.

TABLE 1

Chemical composition of the human phantom model

| Components | Percentage by weight (%) |
|---|---|
| Sugar | 46.78 |
| NaCl | 1.49 |
| Bactericide | 0.05 |
| Hydroxyethyl Cellulose | 0.52 |
| Water | 51.16 |

Figure 6:
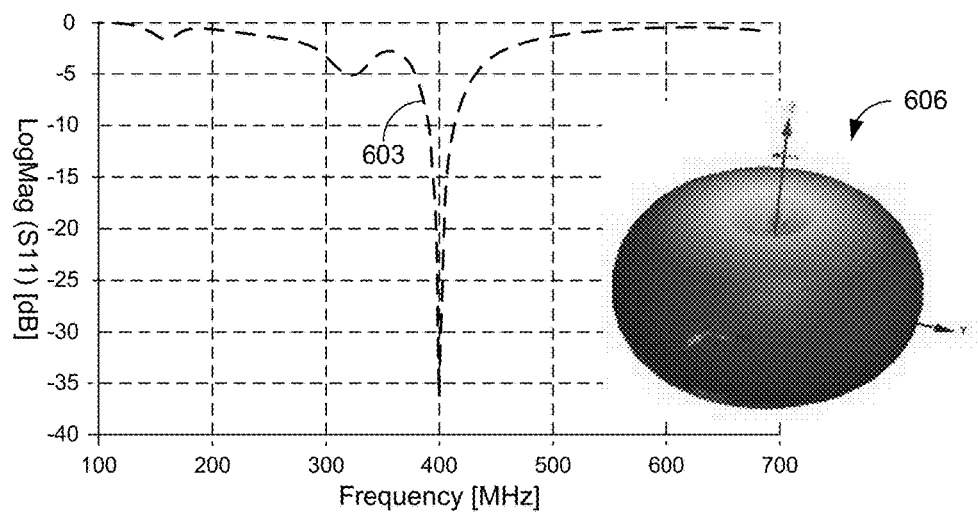
FIG. 6 illustrates examples of a measured radio frequency (RF) return loss and a simulated omni-directional radiation pattern of a fabricated helix antenna of FIGS. 1 and 3 in accordance with various embodiments of the present disclosure.

The return loss of the fabricated helix antenna 503 was measured using an Agilent E5071C network analyzer after a standard one port calibration procedure. Referring to FIG. 6, shown is the measured antenna return loss 603 of the fabricated helix antenna 503. As can be seen, a good return loss performance was exhibited at 400 MHz. The fabricated helix antenna 503 was found to have an antenna gain of −10 dBi and an efficiency of 98% in free space. However, in the human body, the gain drops to −38 dBi which is mainly due to the body absorption of electromagnetic waves. FIG. 6 also shows a graphical representation of the simulated omni-directional radiation pattern 606 for the fabricated helix antenna 503.

Antenna Near Field Performance

Figure 7:
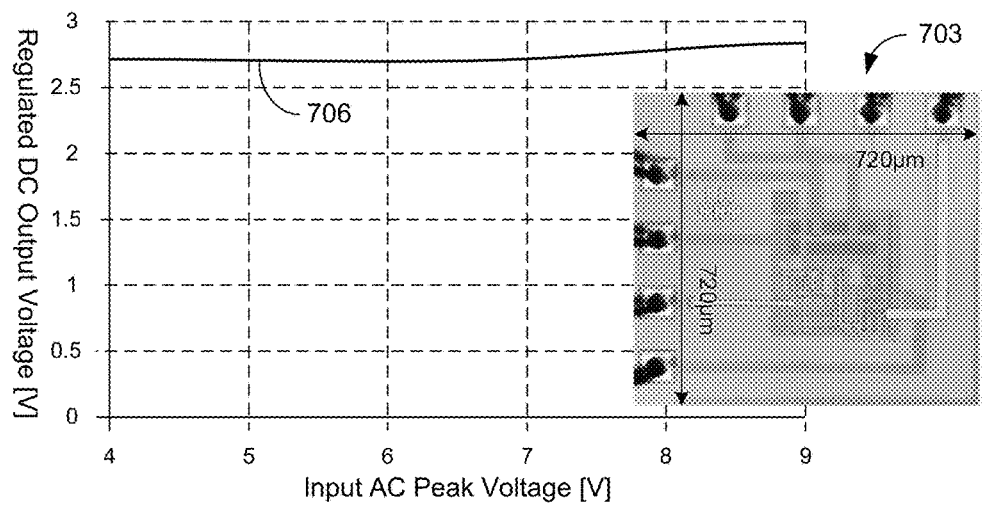
FIG. 7 illustrates an example of a measured direct current (DC) output of a power management IC die as a function of an input alternating current (AC) input from a fabricated helix antenna of FIGS. 1 and 3 in accordance with various embodiments of the present disclosure.

The wireless power transmission uses inductive coupling between an external coil of a power source and the fabricated helix antenna 503. The input voltage level can be varied depending on the capsule position and orientation. Therefore, a wireless power management IC was designed using a ONSemi 3M2P 0.5 µm CMOS process. Referring to FIG. 7, shown is a photomicrograph of the implemented power management IC die 703. The power management IC die 703 is composed of a high efficiency rectifier, a precision voltage reference, and a voltage regulator.

Voltage regulation performance with the swept input AC voltage over a wide range of 4V and 9V was characterized using an Agilent waveform generator 33120A at 150 kHz as illustrated in FIG. 7. The regulated DC output voltage 706 shows a very stable output voltage of 2.6 V during the test. When coupled to the fabricated helix antenna 503, the voltage induced in the fabricated helix antenna 503 will be regulated to maintain the constant output voltage, which is supplied to an energy storage device 115 (e.g., a super capacitor or battery). While the fabricated helix antenna 503 was evaluated at 150 kHz, other frequencies may be utilized to provide near field power transmission. The frequency of operation may be varied to improve or optimize the efficiency of the power transfer.

A dual function helix antenna for both wireless RF communication and wireless near field power delivery has been demonstrated. The helix antenna was implemented based on the use of a flexible substrate and was fabricated by patterning a piece of copper trace on the substrate and wrapping the trace on the substrate into the desired cylindrical shape for an endoscope application. The fabricated helix antenna showed an excellent omni-directional radiation pattern (FIG. 6) as well as wireless charging capability (FIG. 7).

One embodiment, among others, is a helix antenna comprising a flexible substrate and a copper trace disposed on a side of the flexible substrate at a tilting angle ($\theta$). Turns of the helix antenna can be formed from the copper trace by wrapping the flexible substrate. Adjacent turns of the helix antenna can be radially displaced by about a thickness of the flexible substrate. A microstrip feed or a coplanar waveguide feed coupled to an end of the copper trace of the helix antenna. The helix antenna can be tuned for a predefined radio frequency for wireless communications.

Another embodiment is a system comprising a helix antenna with a radio frequency (RF) communication circuit and a low frequency (LF) power transmission circuit coupled to a first end of the helix antenna. The RF communication circuit can be configured to process RF signals received by the helix antenna and the LF power transmission circuit can be configured to regulate LF voltage induced in the helix antenna. The helix antenna can be tuned for a predefined RF for wireless communications. The RF communication circuit can comprise a band pass filter configured to pass communication signals at the predefined RF. The RF communication circuit can comprise a RF transceiver configured to receive and transmit wireless communications via the helix antenna at the predefined RF. The LF power transmission circuit can comprise power management circuitry configured to receive LF voltage induced in the helix antenna and convert the LF voltage into a regulated DC voltage. The LF power transmission circuit can comprise an energy storage device coupled to the output of the power management circuitry. The RF communication circuit can be coupled to the first end of the helix antenna via a microstrip feed or a coplanar waveguide feed. The system can be an endoscope with the helix antenna configured for operation within a human body and/or a body of an animal.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A helix antenna, comprising:
   a flexible substrate comprising a first side and a second side opposite the first side, the flexible substrate having a longitudinal length from a proximal end to a distal end of the flexible substrate, and a width between parallel sides of the flexible substrate, the parallel sides extending from the proximal end to the distal end; and
   a copper trace disposed on the first side of the flexible substrate, the copper trace extending across the first side of the flexible substrate from the proximal end to the distal end at a non-zero tilting angle (θ) with respect to the longitudinal length when the flexible substrate is laid flat, where a position of the copper trace on the flexible substrate linearly varies between the parallel sides as the copper trace extends from the proximal end to the distal end of the flexible substrate,
   where the flexible substrate is rolled up along its longitudinal length with each of the parallel sides radially aligned with themselves, the rolled up flexible substrate having a cylindrical shape comprising a first end and a second end separated by the width of the flexible substrate, where the helix antenna comprises a tapered helix coil with varying diameter along its axial length, the tapered helix coil having adjacent turns formed from the copper trace on the first side of the rolled up flexible substrate, where the adjacent turns of the tapered helix coil are axially displaced from each other along the axial length and radially displaced from each other by the flexible substrate.

2. The helix antenna of claim 1, wherein the adjacent turns of the tapered helix coil are radially displaced from each other by about a thickness of the flexible substrate between the first and second sides.

3. The helix antenna of claim 1, further comprising a microstrip feed or a coplanar waveguide feed disposed on the proximal end of the first side of the flexible substrate and coupled to an end of the copper trace.

4. The helix antenna of claim 3, wherein a ground is disposed on the second side of the flexible substrate opposite the microstrip.

5. The helix antenna of claim 1, wherein the first end of the helix antenna is coupled to a radio frequency (RF) communication circuit through a RF pathway that is impedance matched for data communication in a MHz range, a GHz range or a combination thereof.

6. The helix antenna of claim 5, wherein the helix antenna is tuned for a predefined radio frequency for wireless communications.

7. The helix antenna of claim 1, wherein the first end of the helix antenna is coupled to a low frequency (LF) power transmission circuit through a LF pathway that is impedance matched for power transfer from the helix antenna to an energy storage device in a kHz range.

8. The helix antenna of claim 1, wherein the flexible substrate is rolled up from the distal end to the proximal end.

9. A system, comprising:
   a helix antenna comprising a tapered helix coil with varying diameter along its axial length, the tapered helix coil formed by a copper trace on a flexible substrate that is rolled into a cylindrical shape, where adjacent turns of the tapered helix coil are axially displaced from each other along the axial length of the tapered helix coil and radially displaced from each other by the flexible substrate, where:
   the flexible substrate has a longitudinal length from a proximal end to a distal end of the flexible substrate, and a width between parallel sides of the flexible substrate, the parallel sides extending from the proximal end to the distal end, where the flexible substrate is rolled up along its longitudinal length with each of the parallel sides radially aligned with themselves, the cylindrical shape of the rolled up flexible substrate comprising a first end and a second end separated by the width of the flexible substrate; and
   the copper trace is disposed on a first side of the flexible substrate, the copper trace extending across the first side of the flexible substrate from the proximal end to the distal end at a non-zero tilting angle (θ) with respect to the longitudinal length when the flexible substrate is laid flat, where a position of the copper trace on the flexible substrate linearly varies between the parallel sides as the copper trace extends from the proximal end to the distal end of the flexible substrate;
   a radio frequency (RF) communication circuit coupled to a first end of the helix antenna through a RF pathway that is impedance matched for data communication in a MHz range, a GHz range or a combination thereof, the RF communication circuit configured to process RF signals received by the helix antenna and provided through the RF pathway; and
   a low frequency (LF) power transmission circuit coupled to the first end of the helix antenna through a LF pathway that is impedance matched for power transfer in a kHz range, the LF power transmission circuit configured to regulate LF voltage induced in the helix antenna and provided through the LF pathway.

10. The system of claim 9, wherein the helix antenna is tuned for a predefined RF for wireless communications.

11. The system of claim 10, wherein the RF communication circuit comprises a band pass filter configured to pass communication signals at the predefined RF.

12. The system of claim 11, wherein the RF communication circuit comprises a RF transceiver configured to receive and transmit wireless communications via the helix antenna at the predefined RF.

13. The system of claim 9, wherein the LF power transmission circuit comprises power management circuitry configured to receive the LF voltage induced in the helix antenna and convert the LF voltage into a regulated DC voltage.

14. The system of claim 13, wherein the LF power transmission circuit comprises an energy storage device coupled to an output of the power management circuitry.

15. The system of claim 9, wherein the adjacent turns of the tapered helix coil are radially displaced from each other by about a thickness of the flexible substrate.

16. The system of claim 9, further comprising a microstrip feed or a coplanar waveguide feed disposed on the proximal end of the flexible substrate and coupled to an end of the copper trace.

17. The system of claim 16, wherein the RF communication circuit is coupled to the first end of the helix antenna via the microstrip feed or the coplanar waveguide feed.

18. The system of claim 9, wherein the system is an endoscope and the helix antenna is configured for operation within a human body.

19. The system of claim 9, wherein the system is an endoscope and the helix antenna is configured for operation within a body of an animal.

* * * * *